United States Patent Office 3,045,016
Patented July 17, 1962

3,045,016
6-HYDRAZINOPYRIMIDINE DERIVATIVES
George William Miller and Francis Leslie Rose, Macclesfield, England, assignors to Imperial Chemical Industries Limited, London, England, a corporation of Great Britain
No Drawing. Filed Sept. 8, 1959, Ser. No. 838,414
Claims priority, application Great Britain Oct. 3, 1958
7 Claims. (Cl. 260—256.4)

This invention relates to new organic compounds and more particularly it relates to new pyrimidine derivatives which are useful as intermediates in the preparation of compounds possessing valuable therapeutic properties.

According to the invention we provide pyrimidine derivatives of the formula:

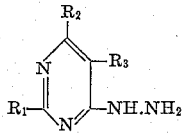

wherein $R_1$, $R_2$ and $R_3$, which may be the same or different, stand for alkyl, optionally substituted by alkoxy or halogen radicals, alkenyl or cycloalkyl radicals, $R_1$ stands for a phenyl radical, $R_2$ stands for a halogen radical, $R_3$ stands for hydrogen or for a halogen radical or $R_2$ and $R_3$ may be joined to form a polymethylene radical.

As alkyl radicals there may be mentioned for example lower alkyl radicals each containing up to 7 carbon atoms and substituted alkyl radicals may be ethoxyalkyl radicals for example the ethoxyethyl radical, and trihalogenoalkyl radicals for example the trifluoromethyl radical. An alkenyl radical may be for example the allyl radical and a cycloalkyl radical may be for example the cyclohexyl radical. The substituents ($R_2$ and $R_3$) which may be halogen radicals may be for example chlorine or bromine radicals. Particularly valuable compounds of the above stated formula to be used as starting materials in the preparation of therapeutic compounds are those wherein $R_3$ stands for hydrogen and $R_1$ and $R_2$, the same or different, stand for lower alkyl radicals each containing not more than 7 carbon atoms and preferably methyl, ethyl, n-propyl and n-butyl radicals.

According to a further feature of the invention we provide a process for the manufacture of the said pyrimidine derivatives which comprises interaction of the corresponding pyrimidine of the formula:

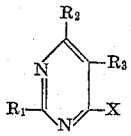

wherein $R_1$, $R_2$ and $R_3$ have the meaning stated above and X stands for a halogen atom or an alkylthio group and hydrazine.

Suitable pyrimidines may be for example the chloropyrimidines. The interaction may conveniently be carried out in the presence of a diluent or solvent for example water, ethanol or β-ethoxyethanol and the process may be accelerated or completed by the application of heat.

The halogenopyrimidines for example the chloropyrimidines used as starting material in the above process may be obtained by interaction of the corresponding hydroxypyrimidines and a phosphorus oxyhalide for example phosphorus oxychloride. The said hydroxypyrimidines may themselves be obtained by interaction of the corresponding amidine and a β-keto ester or a diester in the presence of a condensing agent for example sodium methoxide.

As stated above, the pyrimidine derivatives with which this invention is concerned are useful as starting materials for reaction for example with cyanogen chloride in order to obtain 2-amino-s-triazolo-(2,3-c)-pyrimidine derivatives having valuable therapeutic properties as described in our copending application Serial No. 838,413, filed on even date herewith.

The invention is illustrated but not limited by the following examples in which the parts are by weight.

Example 1

57 parts of 2-ethyl-4-methyl-6-chloro-pyrimidine, B.P. 93° C./20 mm., obtainable by the procedure as described at the end of Example 2, are dissolved in 160 parts of ethanol at 18–22° C. and the solution is added dropwise to a solution of 40 parts of hydrazine hydrate in 160 parts of boiling ethanol. The mixture is heated under reflux for 15½ hours and is then cooled at 0° C. The mixture is filtered and the filtrate is diluted with 80 parts of benzene and the mixture is evaporated to dryness. The solid residue is boiled with 250 parts of ethyl acetate and the suspension is filtered. The filtrate is cooled for one hour at 0° C. and the mixture is then filtered. The solid residue is washed with cold ethyl acetate, dried at 60° C. and is then crystallized from ethanol. There is thus obtained 2-ethyl-4-methyl-6-hydrazino-pyrimidine as a colorless crystalline solid, M.P. 150° C.

Example 2

10 parts of 2-n-propyl-4-methyl-6-chloro-pyrimidine are dissolved in 13 parts of ethanol at 18–22° C. and the solution is added dropwise to a solution of 6.5 parts of hydrazine hydrate in 13 parts of boiling ethanol. The mixture is heated under reflux for 16 hours and is then cooled at 0° C. The mixture is filtered and the filtrate is diluted with 10 parts of benzene and the mixture is evaporated to dryness. The residue is extracted with 100 parts of ethyl acetate at 18–22° C., the suspension is filtered and the filtrate is evaporated to dryness. The solid residue is crystallized from a mixture of ethyl acetate and petroleum ether (B.P. 40–60° C.). There is thus obtained 2-n-propyl-4-methyl-6-hydrazinopyrimidine as a colorless crystalline solid, M.P. 87° C.

The 2-n-propyl-4-methyl-6-chloropyrimidine used as starting material may be obtained according to the following process: 88 parts of 2-n-propyl-4-methyl-6-hydroxypyrimidine are added to 330 parts of phosphorus oxychloride and the mixture is heated gently under reflux for 3¾ hours in an oil bath heated at 150° C. The clear solution is allowed to cool slightly and then reduced to half volume under reduced pressure. The residual solution is cooled to 18–22° C. and is then poured slowly into a well stirred mixture of 1000 parts of ice and 300 parts of 40% aqueous sodium hydroxide solution. When the addition is complete the mixture is stirred for one hour and is then extracted three times using 500 parts of chloroform each time. The chloroform extracts are combined and washed with 100 parts of ice-water, dried over anhydrous magnesium sulphate and finally evaporated at 60° C. and 24 mm. pressure. The residual brown oil is then distilled under reduced pressure and there is thus obtained 2-n-propyl-4-methyl-6-chloropyrimidine, as a pale yellow oil, B.P. 108–110° C./24 mm.

Example 3

The process described in Example 2 is repeated except that the 10 parts of 2-n-propyl-4-methyl-6-chloropyrimidine used as starting material are replaced by an equivalent amount of 2-n-butyl-6-chloro-4-methylpyrimidine and there is thus obtained 2-n-butyl-6-hydrazino-4-methylpyrimidine as a colorless crystalline solid M.P. 68–70° C. (from a mixture of ethyl acetate and petroleum ether, B.P. 40–60° C.).

Similarly there is obtained from 6-chloro-4-methyl-2-n-pentylpyrimidine B.P. 134–138° C./25 mm., 6-hydrazino-4-methyl-2-n-pentylpyrimidine M.P. 68–72° C.; from 6-chloro-4-ethyl-2-methylpyrimidine, 6-hydrazino-4-ethyl-2-methylpyrimidine M.P. 127–128° C. (ethyl acetate); from 6-chloro-2-methyl-4-n-propylpyrimidine, 6-hydrazino-2-methyl-4-n-propylpyrimidine, M.P. 100–102° C. (ethyl acetate); from 4-n-butyl-6-chloro-2-methyl-pyrimidine, 4-n-butyl-6-hydrazino-2-methylpyrimidine, M.P. 83–85° C. (from a mixture of ethyl acetate and petroleum ether, B.P. 60–80° C.); from 6-chloro-2,4-diethylpyrimidine, 2,4-diethyl-6-hydrazinopyrimidine M.P. 86–87° C. (from a mixture of ethyl acetate and petroleum ether, B.P. 40–60° C.); from 6-chloro-2-ethyl-4-n-propylpyrimidine, 2-ethyl-6-hydrazino-4-n-propylpyrimidine, colorless oil B.P. 187–189° C./20 mm.; from 6-chloro-2,4-di-n-propylpyrimidine, 6-hydrazino-2,4-di-n-propylpyrimidine, M. P. 48–50° C. (from a mixture of ether and petroleum ether, B.P. 40–60° C.); from 6-chloro-4-ethyl-2-n-propylpyrimidine, 4-ethyl - 6 - hydrazino-2-n-propylpyrimidine, colorless oil, B.P. 184–186° C./25 mm.; from 4-n-butyl-6-chloro-2-n-propylpyrimidine, 4-n-butyl-6-hydrazino-2-n-propylpyrimidine, pale yellow oil; from 6-chloro-4-n-heptyl-2-n-propylpyrimidine B.P. 191–192° C./26 mm., 4-n-heptyl-6-hydrazino-2-n-propylpyrimidine, colorless oil B.P. 234–236° C./24 mm.; from 6-chloro-2,4,5-trimethylpyrimidine, 6-hydrazino-2,4,5-trimethylpyrimidine M.P. 164–166° C. (ethyl acetate); from 6-chloro-4,5-dimethyl-2-n-propylpyrimidine B.P. 122–126° C./22 mm., 6-hydrazino-4,5-dimethyl-2-n-propylpyrimidine hemihydrate, pale yellow solid M.P. 78–80° C. (from a mixture of ether and petroleum ether, B.P. 40–60° C.); from 6-chloro-5-ethyl-4-methyl-2-n-propylpyrimidine B.P. 132° C./22 mm., 5-ethyl-6-hydrazino-4-methyl-2-n-propylpyrimidine hemihydrate M.P. 62–65° C. (from a mixture of ether and petroleum ether, B.P. 40–60° C.); from 5-allyl-6-chloro-4-methyl-2-n-propylpyrimidine, B.P. 145–146° C./30 mm., 5-allyl-6-hydrazino-4-methyl-2-n-propylpyrimidine, delequescent solid (from a mixture of ether and petroleum ether, B.P. 40–60° C.); from 6-chloro-2-ethoxyethyl-4-methylpyrimidine, 2 - ethoxyethyl-6-hydrazino-4-methylpyrimidine, colorless oil; from 6-chloro-2-methylpyrimidine M.P. 55–57° C., 6-hydrazino-2-methylpyrimidine M.P. 122–124° C. (ethyl acetate); from 6-chloro-4-cyclohexyl-2-n-propylpyrimidine, 4-cyclohexyl-6-hydrazino-2-n-propylpyrimidine, colorless oil.

*Example 4*

The process described in Example 2 is repeated except that 10 parts of 2-isopropyl-4-methyl-6-chloropyrimidine, B.P. 108–110° C./24 mm. (obtainable by the procedure described at the end of Example 2) are used as starting material instead of 10 parts of 2-n-propyl-4-methyl-6-chloropyrimidine. There is thus obtained 2-isopropyl-4-methyl-6-hydrazinopyrimidine as a colorless crystalline solid, M.P. 86° C.

*Example 5*

15 parts of 2-phenyl-4-methyl-6-chloropyrimidine are added to a solution of 8.1 parts of hydrazine hydrate in 120 parts of ethanol. The mixture is heated under reflux for 16 hours and is then cooled for one hour at 0° C. and filtered. The filtrate is evaporated to dryness under reduced pressure and the residue is stirred with 25 parts of water at 5° C. The mixture is filtered and the solid residue is washed with water, dried at 60° C. and then crystallised from carbon tetrachloride. There is thus obtained 2-phenyl-4-methyl-6-hydrazinopyrimidine as a colorless crystalline solid, M.P. 96° C.

*Example 6*

6 parts of 6-chloro - 2 - n - propyl-4-trifluoromethylpyrimidine in 12 parts of ethanol are added dropwise over 1 hour to a solution of 6 parts of hydrazine hydrate in 16 parts of ethanol at 60° C. The reaction mixture is heated under reflux for 2 hours and is then evaporated to dryness under reduced pressure. The residue is triturated with water, and the solid is recovered by filtration, washed with water, dried and crystallised from petroleum ether (B.P. 80–100° C.). There is thus obtained 6-hydrazino-2-n-propyl-4-trifluoromethylpyrimidine as a colorless crystalline solid M.P. 66–67° C.

*Example 7*

152 parts of 4,6-dichloro-2-methylpyrimidine are dissolved in 760 parts of ethanol at 18–22° C. To the well-stirred solution are added 185 parts of hydrazine hydrate at such a rate that the temperature of the mixture does not exceed 60° C. When this addition is complete the reaction mixture is stirred for a further 15 minutes and is then diluted with 100 parts of benzene and evaporated to dryness under reduced pressure. The residue is extracted with boiling ethyl acetate. The mixture is filtered and the ethyl acetate filtrate is cooled in ice-water and the solid precipitate removed by filtration. There is thus obtained 4-chloro-6-hydrazino-2-methyl-pyrimidine as a colorless crystalline solid M.P. 170–172° C.

*Example 8*

10 parts of 4,6-dichloro-2-n-propylpyrimidine are dissolved in 48 parts of ethanol at 18–22° C. 10.5 parts of hydrazine hydrate are added slowly to the well-stirred solution at such a rate that the temperature is maintained at 50° C. The reaction mixture is cooled in ice water and a heavy oily layer is separated. The upper layer is diluted with 10 parts of benzene and evaporated to dryness under reduced pressure. The residue is extracted with boiling ethyl acetate and the ethyl acetate extract is cooled in ice-water and the solid is recovered by filtration. There is thus obtained 4-chloro-6-hydrazino-2-n-propylpyrimidine as a colorless crystalline solid M.P. 90–92° C.

*Example 9*

9.1 parts of 6-chloro-2-methyl-4,5-tetramethyleno-pyrimidine in 20 parts of ethanol are added to a solution of 6 parts of hydrazine hydrate in 20 parts of ethanol and the solution is heated under reflux for 2 hours. The reaction mixture is then cooled in ice-water and the solid precipitate is removed by filtration. The filtrate is evaporated to dryness under reduced pressure and the residue is extracted with boiling toluene. The toluene extract is cooled in ice-water and the solid precipitate is recovered by filtration, washed with benzene and dried. It is recrystallized from toluene and there is thus obtained 6-hydrazino-2-methyl-4,5-tetramethylenopyrimidine as a colorless crystalline solid M.P. 178–180° C.

*Example 10*

The process described in Example 2 is repeated except that the 10 parts of 2-n-propyl-4-methyl-6-chloropyrimidine used as starting material are replaced by an equivalent amount of 5-bromo-6-chloro-4-methyl-2-n-propylpyrimidine. There is thus obtained 5-bromo-6-hydrazino-4-methyl-2-n-propylpyrimidine as a yellow crystalline solid, M.P. 89–90° C. (from ether).

The starting material may be obtained as follows:
50 parts of 6-hydroxy-4-methyl-2-n-propylpyrimidine are dissolved in 750 parts of water and 88 parts of bromine are added slowly with stirring until suspension no longer decolorizes bromine. The solution is neutralized with ammonium hydroxide, cooled and the solid precipitate is recovered by filtration, washed with water and crystallized from ethanol. There is thus obtained 5-bromo - 6 - hydroxy - 4-methyl-2-n-propylpyrimidine as a colorless crystalline solid M.P. 152–154° C. It is converted to the corresponding 6-chloropyrimidine by the action of phosphorus oxychloride according to the process as described in Example 2.

The 4-chloropyrimidines used as starting materials in the foregoing examples may be prepared from the corresponding 4-hydroxypyrimidines by the action of phosphorus oxychloride by the process as described in Example 2. Where the crude products are sufficiently pure they are used without further purification, otherwise they are distilled under reduced pressure. The 4-hydroxypyrimidines used as starting materials are prepared from the corresponding amidines and β-keto esters or di-esters with sodium methoxide, by the process as described in Example 2. The preparation of these intermediates is illustrated by the following procedure:

262 parts of n-butyramidine hydrochloride and 260 parts of ethyl acetoacetate are dissolved in 480 parts of methanol. 100 parts of sodium dissolved in 960 parts of methanol are added slowly with stirring and cooling to below 10° C. The reaction mixture is stirred and heated under reflux at 95–100° C. for 16 hours and is then evaporated to dryness. The residue is dissolved in 600 parts of boiling water and the solution is acidified with concentrated hydrochloric acid and the mixture is cooled in ice-water. The solid is recovered by filtration and is washed with a small amount of ice-water and dried. There is thus obtained 6-hydroxy-4-methyl - 2 - n-propylpyrimidine as a colorless crystalline solid M.P. 149–150° C.

In a similar manner there is likewise obtained from actamidine hydrochloride and ethyl-β-keto-heptanoate, 4-n-butyl-6-hydroxy-2-methylpyrimidine M.P. 65–67° C. (petroleum ether B.P. 40–60° C.);

from propamidine hydrochloride and ethyl-β-keto-hexanoate, 2-ethyl-6-hydroxy-4-n-propylpyrimidine, M.P. 67–68° C. (ethyl acetate/petroleum ether, B.P. 40–60° C.);

from n-butyramidine hydrochloride and ethyl-β-keto-heptanoate, 4-n-butyl-6-hydroxy-2-n-propylpyrimidine M.P. 63–65° C. (water);

from n-butyramidine hydrochloride and ethyl-β-keto-decanoate, 4 - n - heptyl - 6-hydroxy-2-n-propylpyrimidine (colorless oil);

from n-butyramidine hydrochloride and ethyl-α-allyl-acetoacetate, 5 - allyl - 6 - hydroxy-4-methyl-2-n-propylpyrimidine, M.P. 109–111° C. (ethyl acetate);

from acetamidine hydrochloride and ethyl cyclohexanone-α-carboxylate, 6-hydroxy-2-methyl-4,5-tetramethylenopyrimidine, M.P. 209–210° C. (n-butanol);

from n-butyramidine hydrochloride and ethyl trifluoroacetylacetate, 6-hydroxy-2 - n - propyl-4-trifluoromethylpyrimidine, M.P. 83–84° C. (petroleum ether B.P. 40–60° C.);

from n-butyramidine hydrochloride and ethyl-β-keto-β-cyclohexyl propionate, 4-cyclohexyl - 6 - hydroxy-2-n-propylpyrimidine, M.P. 110–111° C. (petroleum ether B.P. 60–80° C.);

from n-capronamidine hydrochloride and ethylacetoacetate, 6-hydroxy-4-methyl-2-n-pentylpyrimidine, M.P. 80–81° C. (ethyl acetate);

from propamidine hydrochloride and ethyl-β-keto-pentanoate, 2,4-diethyl-6-hydroxypyrimidine, M.P. 89–90° C. (ethyl acetate);

from n-butyramidine hydrochloride and ethyl-β-keto-n-hexanoate, 6-hydroxy-2,4-di-n-propylpyrimidine, M.P. 71–73° C. (water) and from n-butyramidine hydrochloride and ethyl-β-keto-n-pentanoate, 4-ethyl-6-hydroxy - 2 - n - propylpyrimidine, M.P. 82–84° C. (water).

What we claim is:
1. 2-phenyl-4-lower alkyl-6-hydrazinopyrimidine.
2. 2-lower alkyl-4-fluoro-lower alkyl-6-hydrazinopyrimidine.
3. 2-lower alkyl-4-halo-6-hydrazinopyrimidine.
4. 2-lower alkyl-4-lower alkyl-5-allyl-6-hydrazinopyrimidine.
5. 2-lower alkoxy-lower alkyl-4-lower alkyl-6-hydrazinopyrimidine.
6. 2-lower alkyl-4-cyclohexyl-6-hydrazinopyrimidine.
7. 2-lower alkyl-4,5-tetramethyleno-6-hydrazino-pyrimidine.

References Cited in the file of this patent

Gabriel et al.: Chemische Berichte, vol. 34, page 1241 (1901).
Fabbrini: Gazz. Chim. Ital., vol. 87, page 1294 (1957).
Doyle et al.: Jour. Chem. Soc., pp. 727–732 (1957).
Shioho et al.: Chem. Abstracts, vol. 51, p. 1196 (1957).